(No Model.)
N. SPOFFORD.
IMITATION WIPE JOINT.
No. 284,917. Patented Sept. 11, 1883.
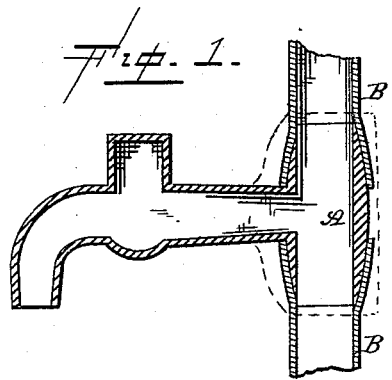
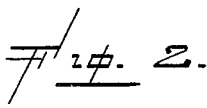
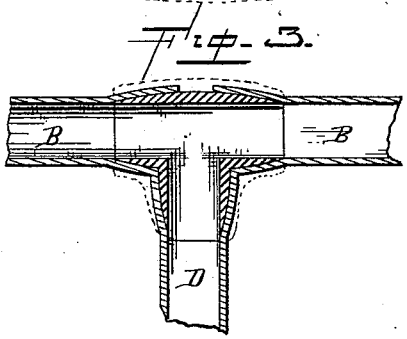
Witnesses.
Louis F. Gardner
J. W. Garner
Inventor.
Nelson Spofford.
per F. A. Lehmann
Atty

UNITED STATES PATENT OFFICE.

NELSON SPOFFORD, OF HAVERHILL, MASSACHUSETTS.

IMITATION WIPE-JOINT.

SPECIFICATION forming part of Letters Patent No. 284,917, dated September 11, 1883.

Application filed April 4, 1883. (No model.)

*To all whom it may concern:*

Be it known that I, NELSON SPOFFORD, of Haverhill, in the county of Essex and State of Massachusetts, have invented certain new and useful Improvements in Imitation Wipe-Joints; and I do hereby declare the following to be a full, clear, and exact description of the invention, such as will enable others skilled in the art to which it pertains to make and use it, reference being had to the accompanying drawings, which form a part of this specification.

My invention relates to an improvement in imitation wipe-joints; and it consists in a wipe-joint which is composed of a hard-metal tube and the lead pipes, which have their ends made to fit over the ends of the tube, and a metallic joint, which is cast around these parts, the joint being composed of metal which requires a higher temperature to melt than lead, and which melts the leaden ends of the metal pipes, so as to form a perfect joint, as will be more fully described hereinafter.

Figure 1 shows a vertical section of a faucet united to two lead pipes. Fig. 2 is a vertical section of two lead pipes united together by a short pipe and ready to have the joint cast around them. Fig. 3 is a vertical section of a branch pipe having the ends of three lead pipes connected to it by the joint.

In uniting the ends of two lead pipes together I insert a short section, A, of hard-metal pipe, and which has tapering ends, into the two ends of the lead pipes B which are to be joined together. The ends of the lead pipe may come together over the tube, or the tube may be long enough to separate the ends any suitable distance. The pipe, with the ends of the lead pipe fitting over the tapering ends, is then placed in a suitable mold, and a melted metal of harder composition than ordinary lead, and requiring a higher temperature to liquefy it, is then poured into the mold around the joint which is inclosed therein. This melted metal may consist of a composition of lead, zinc, tin, or any other metals, either used alone or in combination with others that may be preferred. I do not limit my invention to any particular combination, for this may be varied at will. This melted metal at once melts the ends of the lead pipe, and this melted lead and the melted metal which has been poured into the mold mingle together and form a joint around the short section of metal pipe. As this metal pipe is made of hard material which is not affected by the melted metal, a very strong and secure joint is formed. The pipe would be stronger at this point than any other, even if the interior hard-metal pipe were removed, because the metal out of which the joint is formed has greater tenacity than the lead out of which the pipes are made.

Where it is desired to connect a faucet or cock to the lead pipes, the short pipe or tube having tapering ends will be formed as a part of the faucet or cock, and the tube will then be inserted in between the ends of the lead pipe and the mold formed around the joint and the inner end of the cock or faucet. The melted metal is then poured into the mold, as above described, and the cock or faucet is thus readily united to the pipe. Where a branch pipe, D, is to be united to three pipes, as shown in Fig. 3, the ends of the lead pipes are passed over the ends of the branch pipe, the whole then inclosed in a mold, and the melted metal is then poured in.

Having thus described my invention, I claim—

An imitation wipe-joint composed of a hard-metal tube, A, the pipes B, which have their ends expanded, so as to fit over the ends of the tube A, and a metallic joint, which is cast around these parts, the joint being composed of metal which requires a higher temperature to melt than lead, and which melts the lead round the metal pipes, so as to form a perfect joint, substantially as shown and described.

In testimony whereof I affix my signature in presence of two witnesses.

NELSON SPOFFORD.

Witnesses:
 N. N. SPOFFORD,
 FRANCIS H. PEARL.